United States Patent [19]

Alenius

[11] Patent Number: 5,172,407
[45] Date of Patent: Dec. 15, 1992

[54] CIRCUIT FOR GENERATING METERING PULSES INTENDED FOR PRESENTATION TO A TELECOMMUNICATION SUBSCRIBER

[75] Inventor: Hans Alenius, Johanneshov, Sweden

[73] Assignee: Telefonaktiebolaget L M Ericsson, Stockholm, Sweden

[21] Appl. No.: 774,218

[22] Filed: Oct. 9, 1991

[30] Foreign Application Priority Data

Oct. 24, 1990 [SE] Sweden .............................. 9003398

[51] Int. Cl.⁵ .................. H04M 15/00; H04M 15/38; H04M 19/00
[52] U.S. Cl. .................................... 379/124; 379/251; 379/322
[58] Field of Search ............... 379/130, 124, 126, 457, 379/237, 251, 318, 322

[56] References Cited

U.S. PATENT DOCUMENTS

| | | | |
|---|---|---|---|
| 4,638,122 | 1/1987 | Siligoni et al. | 379/124 |
| 4,720,852 | 1/1988 | Siligoni et al. | 379/124 |
| 4,829,517 | 5/1989 | Malek | 379/124 |

FOREIGN PATENT DOCUMENTS

| | | |
|---|---|---|
| 2295653 | 7/1976 | France . |
| 1-025660 | 1/1989 | Japan . |
| 456630 | 10/1988 | Sweden . |
| 658965 | 12/1978 | Switzerland . |

OTHER PUBLICATIONS

Patent Abstract of Japan, vol. 13, nr. 207 (E-89), abstract of JP 1-025660, published 27 Jan. 1989, NEC Corp.

*Primary Examiner*—Stafford D. Schreyer
*Attorney, Agent, or Firm*—Burns, Doane, Swecker & Mathis

[57] ABSTRACT

A circuit (4) for generating metering pulses (P) includes a multiplier circuit (MULT), a bandpass filter (BF), a comparison circuit (COMP) and a ramp signal generator (RAMP). A current (IC) from the ramp signal generator is multiplied (MULT) by an alternating voltage (VTXX) such as to form the metering pulse (P), which is transmitted, together with a speech signal (SP), to a subscriber (1) for registration. The output voltage (UF) of the bandpass filter (BF) is compared with a reference voltage (UR) in the comparison circuit (COMP). The output (9a) of the comparison circuit is electrically conductive only when the filter voltage (UF) exceeds the reference voltage (UR). When control signals (D) open a switch (SW), a capacitor (C1) is charged by a first current generator (10). The capacitor voltage (VC) increases linearly and controls proportionally the current (IC) of the ramp signal generator (RAMP). When the filter voltage (UF) reaches the reference voltage (UR), the voltage (VC) of the capacitor (C1) is held constant. This is effected by small charging and discharging of the capacitor (C1) for each period of the alternating voltage (VTTX) when the output (9a) of the comparison circuit shifts between non-conductive and conductive states. When the current switch (SW) is closed (D), the capacitor (C1) is discharged by a current $2 \times IS$) through a second current generator (11) until the metering pulse (P) ceases.

7 Claims, 2 Drawing Sheets

CIRCUIT FOR GENERATING METERING PULSES INTENDED FOR PRESENTATION TO A TELECOMMUNICATION SUBSCRIBER

TECHNICAL FIELD present invention relates to a circuit for generating metering pulses intended for presentation to a telecommunication subscriber, said circuit being connected to a telephone exchange and comprising
- a multiplier circuit having at least two inputs;
- a frequency filter whose one pole is connected to an output of the multiplier circuit and also to the telecommunication subscriber connection line;
- a comparison circuit which is provided with a reference source and which has an input connected to the other pole or terminal of the frequency filter, wherein an output of the comparison circuit is electrically non-conductive at least during a time interval when the value of a voltage from the frequency filter is smaller than the value of a reference voltage from the reference source;
- a ramp signal generator which has an input connected to the output of the comparison circuit, a control signal input, and an output which is connected to one of the inputs of the multiplier circuit; and
- a voltage generator which delivers a voltage of a desired frequency and which is connected to the other input of the multiplier circuit, wherein metering control signals are delivered from the telephone exchange to the control signal input of the ramp signal generator.

BACKGROUND ART

There is a need in telecommunication systems for the possibility of being able to send information concerning costs charged to a subscriber who is debited for an established connection. The line circuit of the subscriber includes a circuit which generates metering pulses which can be transferred on the subscriber line from the telecommunication exchange to which the subscriber is connected. A presentation unit installed with the subscriber is activated by the metering pulses and discloses the cost incurred by the connection. The metering pulses are transferred together with other information on the subscriber line and it is essential that this information is not influenced in any way. It is therefore important that the amplitude of the metering pulse will increase and decrease relatively slowly and it is also important that the metering pulses have the correct amplitude so that a correct subscriber debit is recorded. A circuit which generates this type of metering pulse is described in the Swedish Patent Specification No. 8502130-1. This circuit has a multiplier in which a sinusoidal alternating voltage is multiplied with a limiting voltage which determines the amplitude of the metering pulse. The alternating voltage has a frequency of either 12 KHz or 16 KHz. The limiting voltage, which is generated in a generator circuit, rises linearly to a desired amplitude in a first part of the pulse, remains constant over a second part of the pulse and decreases linearly in a third part of said pulse. As the pulse is generated in the multiplier, the pulse is supplied to the subscriber line and registered on the subscriber presentation unit. The pulse is also coupled back through a feedback circuit via a highpass filter through which only the sinusoidal alternating voltage passes. The filtered pulse is rectified and compared with a reference voltage in a comparator, the output signal of which is used to control the generator circuit. The generator circuit has a capacitor and current generator which charges and discharges the capacitor. A control signal generated in a telephone exchange resets a first switch in the generator circuit and connects the one current generator to the capacitor. The voltage over the capacitor, which is the limiting voltage, rises linearly with time and generates the first part of the metering pulse. When the amplitude of the metering pulse is the same as the reference voltage, the comparator opens the first switch. The capacitor voltage therefore remains substantially constant and forms the second part of the metering pulse. The control signal from the telephone exchange closes a second switch in the generator circuit and connects the second current generator to the capacitor. The capacitor is discharged and delivers a linearly decreasing voltage which forms the third part of the metering pulse. One drawback with the aforedescribed circuit is that the amplitude of the metering pulse can vary in response to variations in the subscriber line impedance or in response to variations in amplitude of the sinusoidal alternating voltage. There is thus a risk that a wrong charge will be registered on the subscriber presentation unit.

DISCLOSURE OF THE INVENTION

The present invention is based on the concept of controlling the amplitude of a metering pulse towards a specific value as the pulse is generated, so as to avoid the aforesaid drawbacks. The metering pulse has a first interval with a linearly rising amplitude, a second interval with constant amplitude and a third interval with a linearly decreasing amplitude. A current which determines the amplitude of the second interval of the metering pulse is controlled with the aid of a voltage that is applied across a capacitive element. The metering pulse is generated by multiplying this current by a sinusoidal alternating voltage from a voltage generator. The metering pulse is coupled back through a feedback circuit and the constant amplitude is achieved during the second interval of the metering pulse by discharging the capacitor to the level of the reference voltage for each period of the sinusoidal alternating voltage.

The invention is characterized by the features set forth in the following Claims.

BRIEF DESCRIPTION OF THE DRAWINGS

An exemplifying embodiment of the invention will now be described in more detail with reference to the accompanying drawings, in which.

BEST MODE OF CARRYING OUT THE INVENTION

Figure 1:
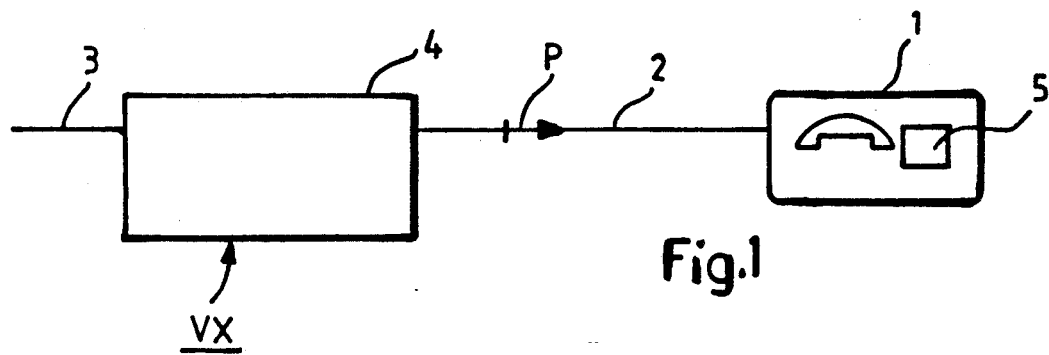
FIG. 1 is a schematic illustration of a telephone exchange and a subscriber.

FIG. 1 illustrates highly schematically a telecommunication exchange VX which is connected to a subscriber 1 via a subscriber connection line 2. When the subscriber 1 makes a call, the exchange VX establishes a connection to a called subscriber over a line 3. The calling subscriber 1 is charged for the call, which is effected via signals in the exchange. It is in the interest of the subscriber 1 to be aware of the charges incurred during the course of the established connection. The exchange VX is able to generate metering pulses P, with the aid of a circuit 4, these pulses being transmitted on the connection line 2 and recorded on a subscriber presentation unit 5.

Figure 2:
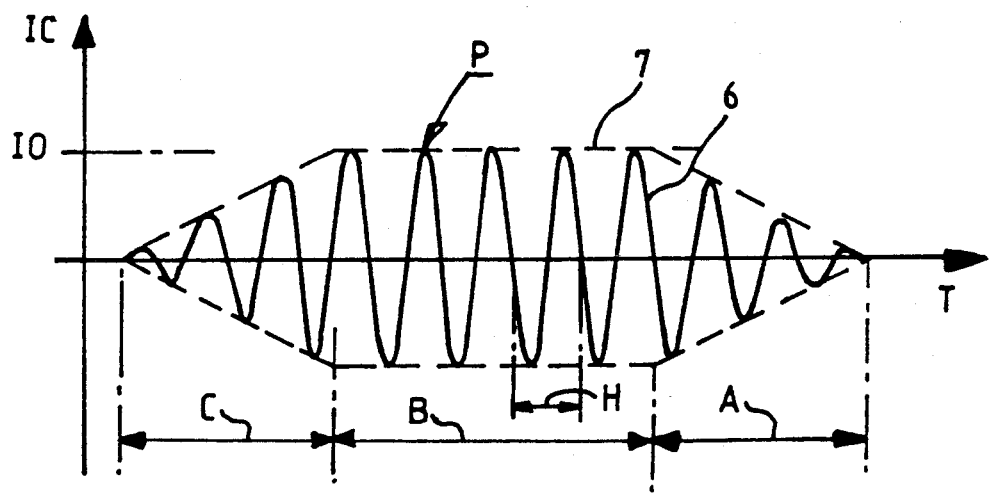
FIG. 2 is a diagrammatic illustration of a metering pulse.

It is essential that the metering pulses P do not disturb or interfere with the connection in progress. Accordingly, the pulses, which in the case of the present embodiment are current pulses, have a carrier frequency which markedly exceeds the frequency of, e.g., a call that is in progress. The highest frequency of the call will be about 4 KHz and the carrier pulse frequency F of 12 KHz or 16KHz is normally selected. In order to avoid disturbance or interference of the metering pulses, it is also necessary for the amplitude of the pulse to increase and decrease relatively slowly, as illustrated in FIG. 2. In this Figure, T signifies time and IC signifies the current strength of the pulse. The current strength of the metering pulse P is shown by a curve 6 which has the selected frequency F. The amplitude of the pulse is defined by a curve 7, which is shown in a broken line in the Figure. The pulse P has a first interval A in which the amplitude of the high frequency current increases linearly with time. The amplitude is constant within a second interval B and has a value IO, while in a third interval C the amplitude decreases linearly to a zero value.

Figure 3:
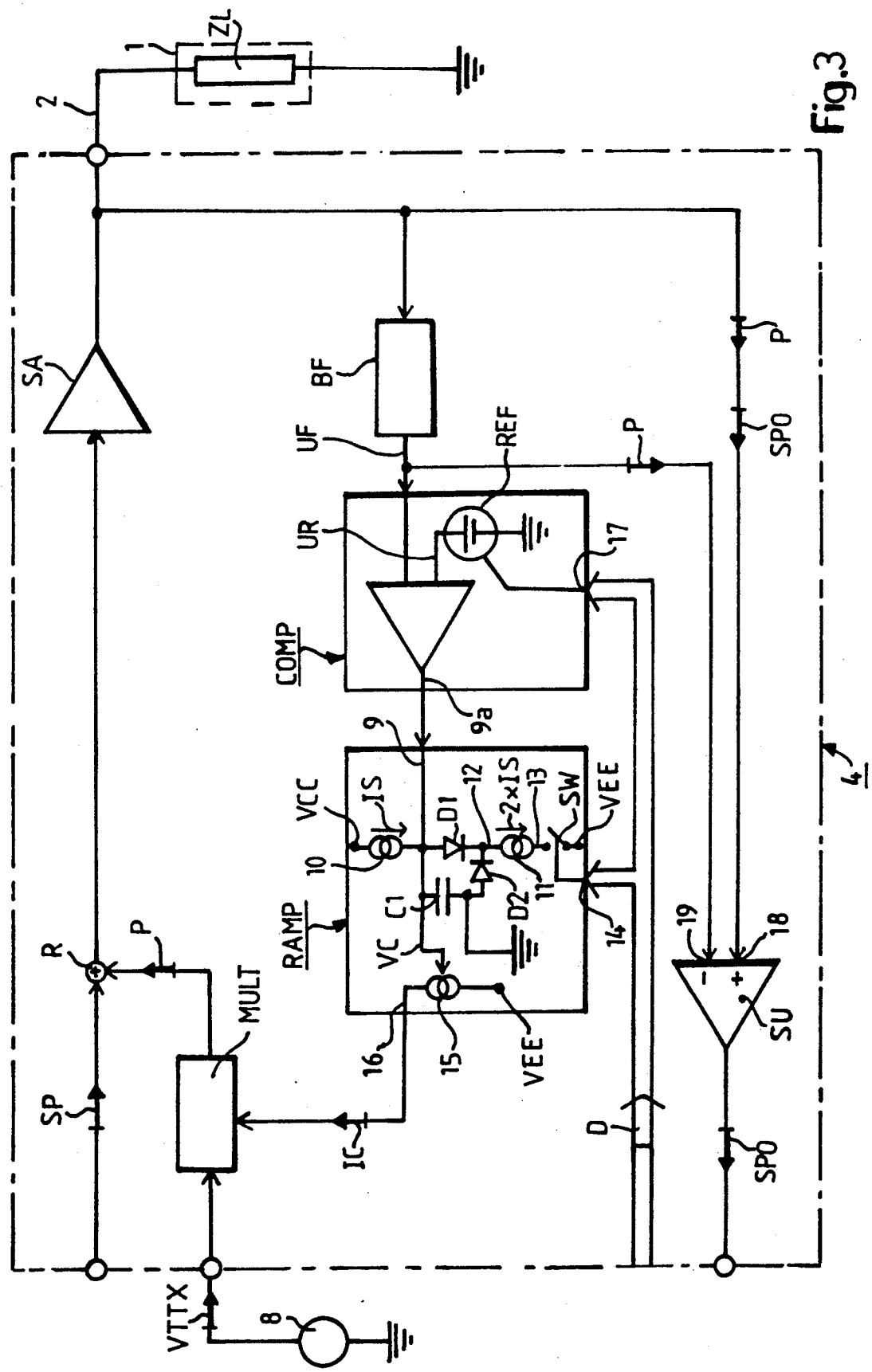
FIG. 3 is a block schematic which illustrates the inventive circuit.

The inventive circuit by means of which the aforedescribed metering pulse P is generated is illustrated more closely in FIG. 3. The circuit 4 has a multiplier circuit MULT which has two inputs. A voltage VTTX is applied to the one input, this voltage being generated in a circuit 8 in the exchange VX and having the aforesaid frequency F. The other input is connected to a ramp signal generator RAMP, which is described in more detail herebelow. RAMP generates a current IC which follows the defining curve 7 in FIG. 2. The multiplier circuit has an output which is connected to the subscriber line at a connection point R. The voltage VTTX and the current IC are multiplied by one another and form the pulse P, which is added to a speech signal SP at the connection point R. This point is connected to an input of a speech signal amplifier SA, in which the speech signal SP and the pulse P are amplified. The output of the speech signal amplifier SA is connected to the connection line 2 and the amplifier delivers the speech signal SP and the metering pulse P to the subscriber 1. In FIG. 3, the subscriber 1 is indicated solely by an impedance ZL, which represents a total impedance of the connection line 2 and the subscriber 1.

For the purpose of generating the current IC, the circuit 4 includes a bandpass filter BF, a comparison circuit COMP and the ramp signal generator RAMP. One pole of the filter BF is connected to the speech signal amplifier SA and its other pole is connected to an input of the comparison circuit COMP. This latter circuit has a reference voltage source REF with a pole voltage UR. COMP has an output 9a which is connected to an input 9 of the ramp signal generator RAMP. The COMP output 9a of the comparison circuit is electrically non-conductive when a voltage UF from the bandpass filter BF lies beneath the pole voltage UR of the reference source REF. When UF lies above UR, the output of the comparison circuit COMP is electrically conductive. The ramp signal generator RAMP has a first current generator 10, which is connected between the input 9 and a voltage source (not shown) having a pole voltage VCC. The pole voltage VCC = +5 V and the current generator 10 drives a current IS in a direction towards the input 4. The ramp signal generator RAMP has a second current generator 11 whose input 12 is connected to the input 9, via a diode D1. The output 13 of the second current generator 11 is connected, via a switch SW, to a voltage source (not shown in detail) having a pole voltage VEE = −5 V. The second current generator 11 drives a current 2×IS from the input 9 through the switch SW. One pole of a capacitor C1 is connected to the input 9, and the other pole of said capacitor is connected to earth potential. The input 12 of the second current generator 11 is also connected to earth potential, via a diode D2. The ramp signal generator RAMP has a control signal input 14 to which the exchange applies metering control signals D. These control signals D cause the control means of the switch SW to place the switch in either its open or its closed position. One pole of the capacitor C1 is connected to a control input of a third current generator 15, and a voltage VC across the poles of the capacitor C1 controls a current IC through the current generator 15. The input of this generator is connected to the voltage source which has the pole voltage VEE = −5 V, and its output is connected to an output 16 of the ramp signal generator RAMP. The output 16 is connected to the aforesaid second input of the multiplier circuit MULT.

The circuit 4 generates the pulses P in the following manner. When the metering control signals D adjust the switch SW to its closed position, the current generator 11 generates its current 2×IS through the switch SW. Half of this current arrives from the current generator 10, via the diode D1, and the other half of said current arrives from earth, via the diode D2. The diodes D1 and D2 are chosen so that they will have the same voltage drop in the forward direction, such that the voltage VC across the capacitor C1 will be VC=0 V. The current through the third current generator 15 will therefore be IC=0, and the amplitude of the current leaving the multiplier circuit MULT will take a zero value. The speech signal SP, which is amplified in the speech signal amplifier SA, is filtered out in the bandpass filter BF, which has its passband frequency F in the voltage VTTX. The value of the voltage UF downstream of the filter BF is zero and lies beneath the reference voltage UR, thereby causing the output of the comparison circuit COMP to become electrically non-conductive.

When the metering control signals D place the current switch SW in its open position, the second current generator 11 will cease to deliver current and the first current generator 10 charges the capacitor C1. The voltage VC across the capacitor increases proportionally with time and the current IC to the multiplier circuit MULT increases proportionally to VC. The amplitude of the alternating voltage from the output of the multiplier circuit hereby increases proportionally with the time T and forms the first interval A of the metering pulse P shown in FIG. 2. The metering pulse P and the speech signal SP are amplified in the speech signal amplifier SA and the speech signal SP is filtered out, as earlier, in the bandpass filter BF. The amplified metering pulse P passes through the filter BF and gives rise to the voltage UF on the input of the comparison circuit COMP. When UF reaches the reference voltage UR, the input of the comparison circuit COMP begins to conduct current, such that current IS from the first current generator is led away from the current generator. Charging of the capacitor C1 ceases and its voltage VC stops increasing. This takes place at the boundary between the time intervals A and B in FIG. 2, such that the multiplier circuit MULT delivers a current having the amplitude IO.

Figure 4:
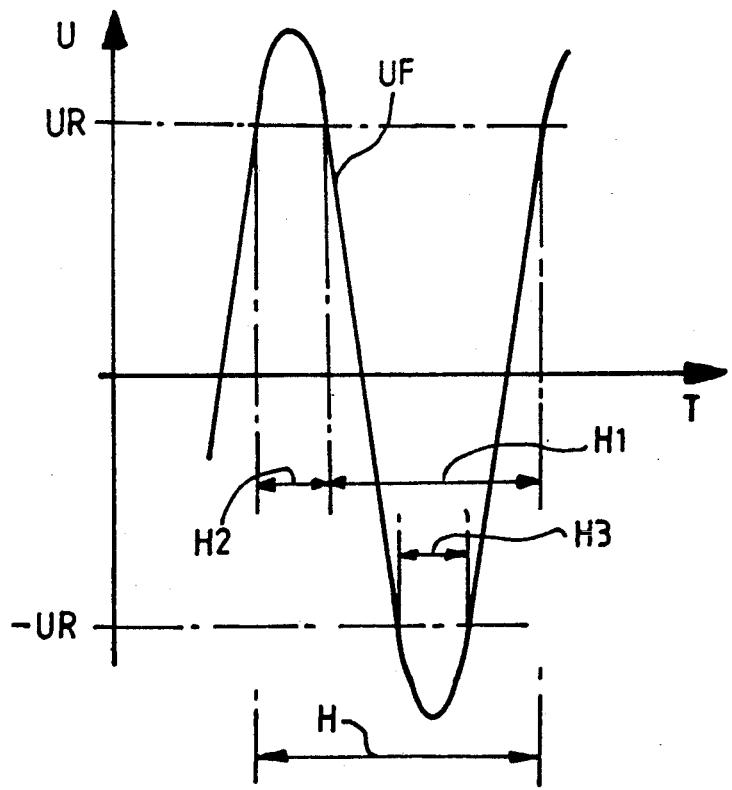
FIG. 4 is a diagrammatic illustration of part of the metering pulse.

The capacitor voltage VC is maintained close to a constant value during the time interval B, by charging and discharging the capacitor C1 with small currents for each period H of the voltage VTTX, as will be explained with reference to FIG. 4. In this Figure, the reference U identifies a voltage and the Figure shows the period H of the voltage UF from the bandpass filter BF. During a first part H1 of the period H, the voltage UF lies beneath the reference voltage UR. The output of the comparison circuit COMP is herewith electrically non-conductive and the first current generator 10 charges the capacitor C1 with the current IS. During a second part H2 of the period H, the voltage UF exceeds the reference voltage UR, so that the output 9a of the comparison circuit will be current conductive. The current IS is herewith led away from the current generator 10 and the capacitor C1 is discharged. This discharge is effected through an impedance which is a parallel coupling of the input impedance of the third current generator 15 and the output impedance of the comparison circuit COMP. The capacitor voltage VC can be caused to vary very close to the aforesaid constant value, by choosing the size of the impedance in relation to the capacitance of the capacitor C1. If a disturbance occurs, for example should the voltage VTTX increase, the voltage UF will increase to a corresponding extent. This will result in an increase in the length of the second period-part H2 during which the capacitor C1 is discharged. Another conceivable disturbance is an abrupt decrease in the impedance ZL of the subscriber line. This will result in a decrease in the amplitude of the voltage UF, such as to cause an increase in the length of the first period-part H1 during which the capacitor C1 is discharged of current IS. The length of the second interval B of the metering pulse P is of the order of 100 ms, and when the voltage VTTX has the aforesaid frequency of 16 KHz, the capacitor voltage VC will be adjusted around the aforesaid constant value in the order of magnitude of 1600 times per metering pulse P. The output voltage of the capacitor C1 causes the third current generator 15 to deliver the almost constant current IO, according to FIG. 2.

When the metering control signals D reset the switch SW to its closed position, the second current generator 11 will begin to discharge the capacitor C1. The voltage VC falls, which, in accordance with the aforegoing, causes the voltage UF to fall beneath the reference voltage UR and the output of the comparitor COMP to become electrically non-conductive. The capacitor C1 is hereby discharged with a current $2 \times IS - IS = IS$ through the first diode D1 and through the switch SW. When the capacitor voltage VC has reached zero value, this zero value is maintained and the second current generator 11 receives current via the two diodes D1 and D2, as mentioned above. In this way, the capacitor voltage VC decreases linearly and controls the third current generator 15 such that the current IC will decrease linearly with time. The third interval C of the metering pulse P is generated in this way.

According to one alternative, it is possible to provide the comparison circuit COMP with two separate amplifiers. One input of these amplifiers is connected to the bandpass filter and the other input thereof is connected to the reference voltage UR and to a reference voltage −UR respectively. Both of the outputs of said amplifiers are connected to the input 9 of the ramp signal generator. The capacitor C1 will thus be discharged twice during the period H, both during the period-part H2 and also during a period-part H3, which is shown in FIG. 4. It is also possible to choose other current values than IS and $2 \times IS$ for the current generators 10 and 11, such that the duration of respective time intervals A and C will be different. The current strength of the second current generator 11, however, must exceed the current strength of the first current generator 10.

As before mentioned, it is important that the metering pulses P are correctly recorded on the subscriber presentation unit and that the pulses have the correct amplitude IO. When the connection lines 2 to the subscriber 1 are long, it is necessary for the amplitude of the metering pulse P to be greater than in the case of short lines. To this end, the comparison circuit COMP has an input 17 for the control signals D, which can adjust the voltage UR of the reference voltage source REF to connection lines of mutually different lengths. It is also important that the metering pulse T only reaches the subscriber to be charged, according to the example the calling subscriber 1. The metering pulse P is therefore separated from an outgoing speech signal SPO from the subscriber 1. To this end, the circuit 4 is provided with an amplifier SU which has an input 18 that is connected to one pole of the bandpass filter BF, and an inverted input 19 which is connected to the other pole of the bandpass filter BF. The outgoing speech signal SPO and the metering pulse P are delivered to the input 18, whereas only the metering pulse P is delivered to the inverted input. The amplifier SU subtracts the metering pulse P and only delivers the outgoing speech signal SPO. This subtraction is possible, since the frequency filter BF is a bandpass filter, as before mentioned, which delivers the metering pulse P to the inverted input 19 in a correct phase.

I claim:

1. A circuit for generating metering pulses intended for presentation to a telecommunication subscriber, said circuit being connected to an exchange and comprising
   a multiplier circuit having at least two inputs;
   a frequency filter whose one pole is connected to an output of the multiplier circuit and also to the telecommunication subscriber connection line;
   a comparison circuit which is provided with a reference source and which has an input connected to another pole of the frequency filter, wherein an output of the comparison circuit is electrically non-conductive at least during a time interval when the value of a voltage from the frequency filter is smaller than the value of a reference voltage from the reference source;
   a ramp signal generator which a has an input connected to the output of the comparison circuit, a control signal input, and an output which is connected to one of the inputs of the multiplier circuit; and
   a voltage generator which delivers a voltage of a desired frequency and is connected to the other input of the multiplier circuit;
   wherein metering control signals are delivered from the telephone exchange to the control signal input of the ramp signal generator;

the ramp signal generator has a capacitive element whose one pole is connected to a first current generator and to said input of the ramp signal generator, and whose other pole is connected to earth potential;

the ramp signal generator has a second current generator having two poles, of which one pole is connected, via rectifiers, to an earth potential and to said input of the ramp signal generator, and of which the other pole is connected to a current switch;

the current of the second current generator exceeds a current of the first current generator;

the control means of the current switch is connected to the said control signal input of the ramp signal generator; and the capacitive element is connected to said output of the ramp signal generator, wherein, when the switch is set to its open position by the metering control signals, the first current generator charges the capacitive element for each period of the voltage of the voltage generator during a part of the period when the output of the comparison circuit is electrically non-conductive, and wherein, when the switch is set to its closed position, the first and the second current generator generate a difference current with which the capacitive element is discharged such that when the switch is opened and closed, the multiplier circuit will deliver the metering pulse to the frequency filter and to the telecommunication subscriber.

2. A circuit according to claim 1, wherein the frequency filter is a bandpass filter having a passband around the frequency of the voltage generator.

3. A circuit according to claim 1, wherein the capacitor element is connected to a control input of a third current generator, whose output constitutes the output of the ramp signal generator.

4. A circuit according to claim 1, wherein the current level of the second current generator is twice as large as the current level of the first current generator.

5. A circuit according to claim 2, wherein the capacitor element is connected to a control input of a third current generator, whose output constitutes the output of the ramp signal generator.

6. A circuit according to claim 2, wherein the current level of the second current generator is twice as large as the current level of the first current generator.

7. A circuit according to claim 3, wherein the current level of the second current generator is twice as large as the current level of the first current generator.

* * * * *